(12) United States Patent
Vick et al.

(10) Patent No.: US 8,713,015 B2
(45) Date of Patent: Apr. 29, 2014

(54) EXPRESSIVE GROUPING FOR LANGUAGE INTEGRATED QUERIES

(75) Inventors: Paul A. Vick, Seattle, WA (US);
Henricus Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 661 days.

(21) Appl. No.: 12/107,840

(22) Filed: Apr. 23, 2008

(65) Prior Publication Data

US 2009/0271382 A1   Oct. 29, 2009

(51) Int. Cl.
*G06F 7/00* (2006.01)
*G06F 17/30* (2006.01)
*G06F 17/00* (2006.01)

(52) U.S. Cl.
CPC .... *G06F 17/30412* (2013.01); *G06F 17/30404* (2013.01); *G06F 17/30424* (2013.01); *G06F 17/30427* (2013.01); *G06F 17/3066* (2013.01); *G06F 17/30657* (2013.01)
USPC .......................................... 707/737; 707/736

(58) Field of Classification Search
CPC .................... G06F 17/30412; G06F 17/30404; G06F 17/30424; G06F 17/30427; G06F 17/3066; G06F 17/30657
USPC ...................... 707/4, 718, 737, 760
See application file for complete search history.

(56) References Cited

U.S. PATENT DOCUMENTS

| | | |
|---|---|---|
| 2004/0193575 A1 | 9/2004 | Chen et al. |
| 2004/0267760 A1 | 12/2004 | Brundage et al. |
| 2007/0027849 A1* | 2/2007 | Meijer et al. ...................... 707/3 |
| 2007/0050347 A1 | 3/2007 | Meijer et al. |
| 2007/0050348 A1 | 3/2007 | Aharoni et al. |
| 2007/0226203 A1 | 9/2007 | Adya et al. |
| 2007/0250470 A1 | 10/2007 | Duffy et al. |
| 2007/0271233 A1 | 11/2007 | Hejlsberg et al. |
| 2008/0133492 A1* | 6/2008 | Meijer et al. ...................... 707/4 |
| 2008/0201237 A1* | 8/2008 | Fernandez et al. .............. 705/26 |

OTHER PUBLICATIONS

Philip Wadler, et al. Comprehensive Comprehensions: Comprehensions with 'Order by' and 'Group by' http://research.microsoft.com/~simonpj/papers/list-comp/list-comp.pdf. Last accessed Dec. 10, 2007, 12 pages.
Don Box, et al. The LINQ Project .NET Language Integrated Query, May 2006. http://www.cs.brown.edu/courses/cs295-11/2006/LINQ.pdf. Last accessed Dec. 10, 2007, 31 pages.
Visual Basic 9.0 Feature Focus—LINQ Queries http://community.bartdesmet.net/blogs/bart/archive/2007/09/05/visual-basic-9-0-feature-focus-linq-queries.aspx. Last accessed Dec. 10, 2007, 12 pages.

(Continued)

*Primary Examiner* — Apu Mofiz
*Assistant Examiner* — Jared Bibbee
(74) *Attorney, Agent, or Firm* — Nicholas Chen; Kate Drakos; Micky Minhas

(57) ABSTRACT

Standard group operators afford expressive grouping across collections of various types for employment by a number of programming languages. The operators can leverage positional information to facilitate grouping of sequential/ordered input data. Groups can also include more than one input element. Additionally or alternatively, the operators can enable multi-level grouping such as nested or hierarchical grouping. In accordance with one aspect, the group operators can be employed in conjunction with language-integrated queries.

20 Claims, 19 Drawing Sheets

(56) References Cited

OTHER PUBLICATIONS

Dr. Erik Meijer, et al. XLinq: XML Programming Refactored (The Return of the Monoids) http://research.microsoft.com/~emeijer/Papers/XMLRefactored.html. Last accessed Dec. 10, 2007, 31 pages.

The .Net: Standard Query Operators, May 2006 http://download.microsoft.com/download/5/8/6/5868081c-68aa-40de-9a45-a3803d8134b8/Standard_Query_Operators.doc. Last accessed Dec. 10, 2007, 30 pages.

* cited by examiner

GROUP BY BORDER THEN FILL PATTERN

GROUP BY FILL PATTERN THEN SHAPE

EXPRESSIVE GROUPING FOR LANGUAGE INTEGRATED QUERIES

BACKGROUND

The pervasiveness of computers and other processor-based devices has resulted in data proliferation such that vast amounts of digital data are created and stored daily. Technology advancements and cost reductions over time have enabled computers and other electronic devices to become commonplace in the lives of most everyone. Enterprises employ computers to collect and analyze sales data, for example. Individuals interact with a number of devices including home computers, laptops, and mobile devices. As a consequence of computer ubiquity, an enormous quantity of digital data is generated daily by both enterprises and individuals.

Traditionally, a database management system (DBMS) is employed to manage interaction with database data. The DBMS efficiently manages requests or queries from users and programs so that these entities are free from having to know specifics pertaining to how and where data is physically stored. Furthermore, in handling requests, the DBMS ensures integrity and security with respect to the data. The most common DBMS is a relational database management system (RDBMS). In this system, data is stored in a tabular format wherein data resides at intersections of rows and columns.

With the advent and growing popularity of the Internet and other networking technologies, various other structured data languages or formats have been developed to facilitate storing and sharing of information across different technology systems. One such language is XML (eXtensible Markup Language), which is a standard language that allows entities and/or groups to share information in a convenient fashion.

Each data storage technology includes mechanisms for querying or retrieving data. For relational databases, SQL (Structured Query Language), a set-based declarative language, can be employed to create, update, and acquire relational data. For example, to retrieve data from a table the following SQL syntax can be specified: "SELECT column_name(s) FROM table_name." The result is a table of rows from the identified table including designated column names. XML data is formatted, queried and/or transformed utilizing XML dedicated technologies such as XSLT (eXtensible Stylesheet Language Transformations), XQuery and/or XPath.

One useful query mechanism for data sources is grouping in which data elements are defined as members of a particular collection or group. In this manner, grouping provides a convenient structuring mechanism. In the context of aggregation (e.g., sum, average, minimum, maximum . . . ), for instance, grouping enables specification of a specific subset of data over which an aggregate function is to be applied.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to grouping with respect to language-integrated queries. More particularly, expressive grouping functionality is provided to facilitate data interaction. In accordance with one aspect of the disclosure, a plurality of standard group operators are provisioned for use by multiple programming languages across one or more data sources. Such grouping functionality can leverage positional information from data sequences, inject a single element into multiple groups, and/or provide multi-level grouping, among other things. Support is also provided for query comprehension syntax for such operators in programming languages. Further yet, the operators can employ accumulation functionality to optimize execution by avoiding building of intermediate structures where possible.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods pertaining to expressive grouping of language-integrated queries is described in detail hereinafter.

Programming languages can include calls to standard group operators for execution for instance as part of a query. Group operators can operate over unordered sets as conventionally done or ordered sequences of data. In this manner, data element positioning can be leveraged in grouping. Further, operators can include a single data element in more than one group and/or allow multi-level grouping, among other things. Such operators can also be included as part of a query comprehension syntax to facilitate use in a numerous programming languages, and mechanisms can be utilized to optimize operator processing by way of accumulation.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

Figure 1:
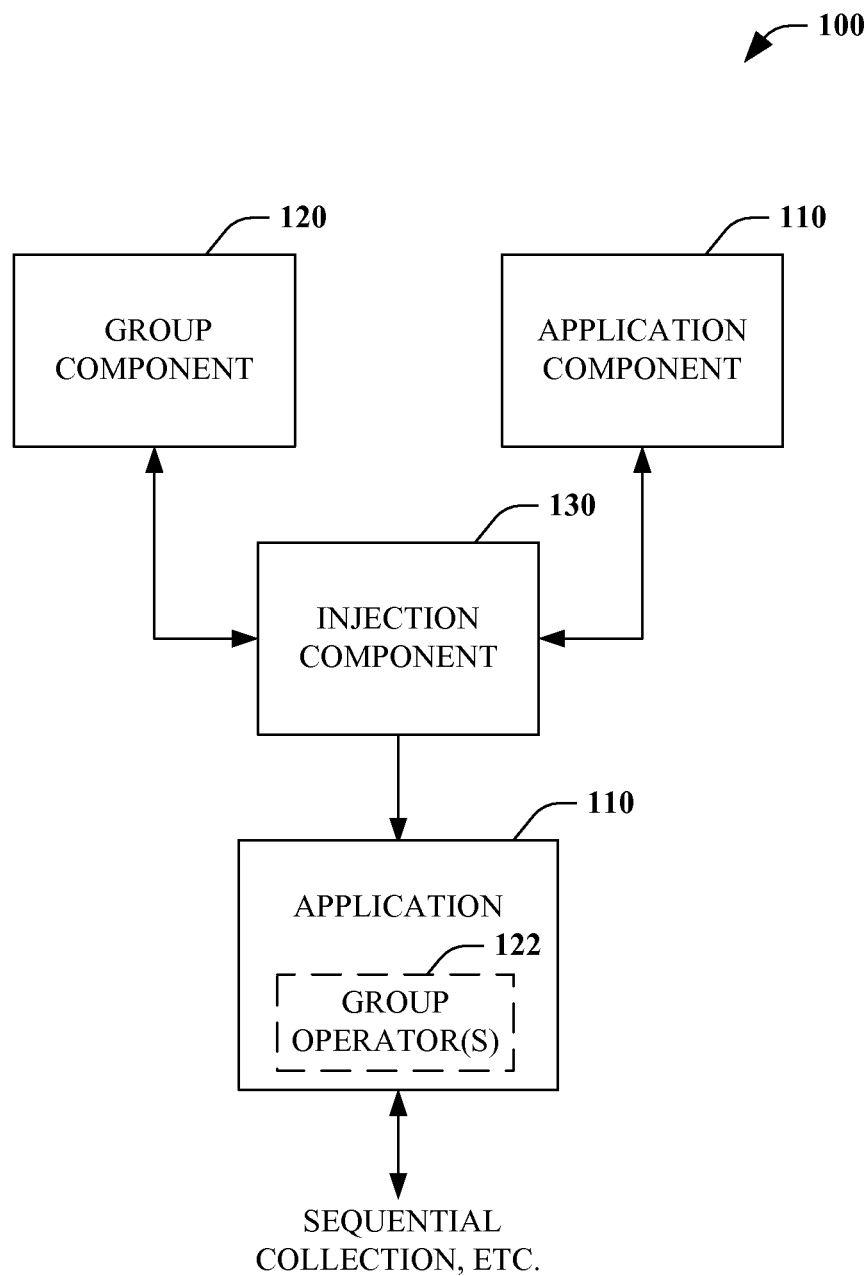
FIG. 1 is a block diagram of a data interaction system in accordance with an aspect of the disclosure.

Referring initially to FIG. 1, a data interaction system 100 is illustrated in accordance with an aspect of the claimed subject matter. The system 100 includes an application component 110 that specifies computer executable functionality in a particular programming language. For example, the application component 110 can correspond to an object oriented programming language such as C#, Visual Basic, and Java, among others. In accordance with one aspect, the application component 110 can include, reference, or otherwise support language-integrated query functionality. In other words, native support is provided within a programming language for querying one or more data sources.

The system also comprises a group component 120 that affords expressive grouping functionality for employment by applications. The group component 120 can expose a plurality of operators to perform various grouping operations. Such operators can be standard or general group operators that are not confined to a single programming language but instead are applicable to many. Stated differently, the operators can define group patterns. Furthermore, these standard operators can be employed to perform grouping across various data formats including object, relational, name-value pairs, and XML, among others.

An injection component 130 also forms part of the system 100 and interacts with the application component 110 and the group component 120. The injection component 130 scans the application component 110 for reference to a group operator. Upon identification, the injection component 130 fetches the appropriate coded functionality from the group component 120 and injects or adds it to the application component 110. As a result, a new application or application component 110 is produced with executable grouping functionality in the form of group operator(s) 122 (also a component as defined herein).

In accordance with various implementations, the injection component 130 can be embodied as or part of a compiler, interpreter or the like. Further, the group component 120 can be embodied as an application-programming interface (API) that provides standard group operators for use by applications. Further yet, it should be appreciated that the group operator components 122 can be processed by a special processor (not shown) associated with an integrated query.

Figure 2:
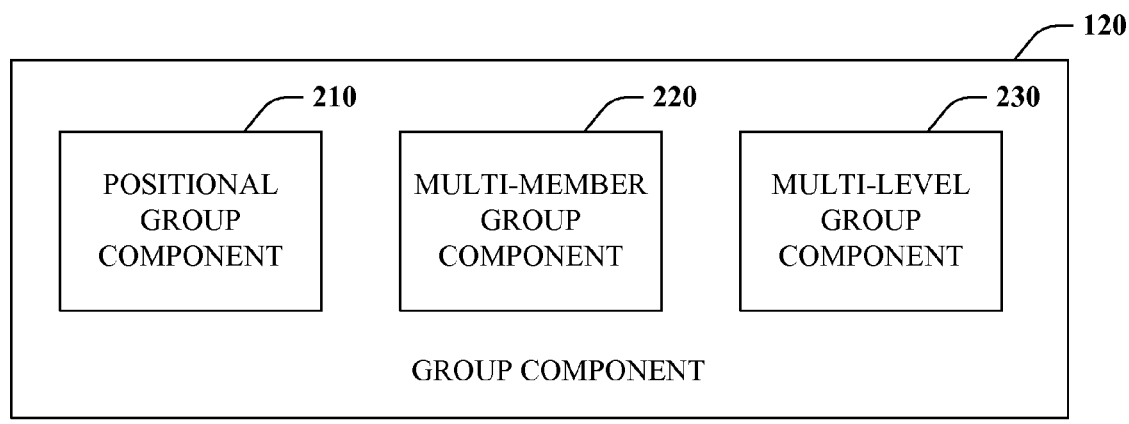
FIG. 2 is a block diagram of a representative group component according to a disclosed aspect.

FIG. 2 depicts a representative group component 120 in accordance with an aspect of the claimed subject matter. As previously described, the group component 120 can provision group functionality for use by applications in the form of group or query group operators. Moreover, the group component 120 can provide expressive grouping functionality. In particular, the group component can include a positional group component 210, multi-member group component 220, and multi-level group component 230.

The positional group component 210 affords operators that leverage position information in an ordered collection. In addition to supporting conventional set-based grouping, the group component 120 provides sequence-based grouping by way of the positional group component 210. As will be described further hereinafter, grouping can be initiated or halted as a function of a particular input value in a sequence.

The multi-member group component 220 provides operators that allow data elements to occupy more than one group. Stated differently, identical source data elements can end up in or be members of different destination groups. Consider data elements with multiple tags. As a result, the same data element can be a member of many groups based on associated tags. For example, a picture with a tag "friend" and "vacation" can end up in a "friend" group and a "vacation" group. This type of grouping does not work on conventional set-based collections such SQL grouping across a relational database, because they require elements to be members of different groups. It is to be noted, however, that the functionality provisioned by the multi-member group component 220 is not limited to sequence-based data but rather is applicable to any collection of data (e.g., ordered or unordered) as are other operators described herein.

The multi-level group component 230 provides operators that enable multi-level or nested grouping. In other words, groups can be grouped resulting in data partitioned at various depths or a hierarchy of groups. This is often desirable in business intelligence scenarios. For example, consider a collection of cars. Cars can now be grouped by color, then brand, then model or various combinations or permutations thereof providing a hierarchical group.

It is to be appreciated that operators and/or the functionality provided thereby can be combined in various ways to enable restriction free composability. For instance, in the previous example multi-member functionality can be employed to allow cars to be members of more than one group. Hence, the same car can end up in a color group and a brand group where color is a sub-group of brand or vice versa. Further yet, these groups could have been populated with a positional operator applied over an ordered set of input.

Figure 3:
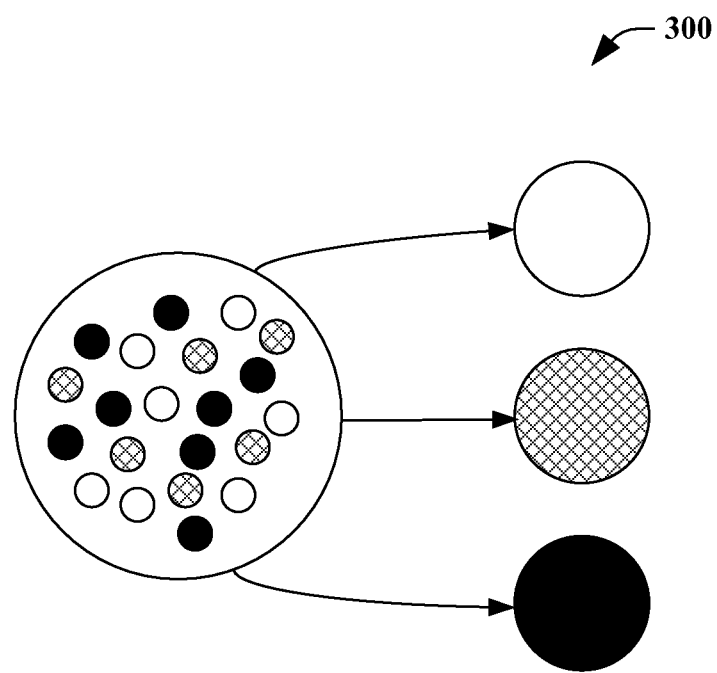
FIG. 3 is a graphical illustration of set-based grouping in accordance with an aspect of the disclosure.

Turning attention to FIG. 3, a graphical illustration of set-based grouping 300 is provided. As previously mentioned the group component 120 of FIG. 1 can include operators to perform set-based grouping, for example as inspired by SQL. In particular, set-based group operators can partition collections into sub-collections based on a key selector function as provided in the following signature of a "GroupBy" operator:

```
static IEnumerable<IGrouping<K, T>> GroupBy<T, K>
    (this IEnumerable<T> source
    , Func<T, K> keySelector
    );
public interface IGrouping<K, T> : IEnumerable<T>
{
    K Key { get; }
}
```

When applying this operator to an input sequence, it will generate a result sequence of groups where each group includes a partition of the input sequence for which the key selector function returned the same value.

As shown, set-based grouping is applied over an unordered collection of data including elements of various values represented by white, black, and crosshatched circles. It is then partitioned into three separate groups for white, black, and crosshatched circles. However, this set-based approach cannot leverage the fact that the input collection may actually be an ordered as a sequence. Moreover, since groups are designated by the key selector function, each element in the input collection can only end up in one result group (e.g., the input is partitioned). Further yet, grouping is applied at only one level.

Figure 4:
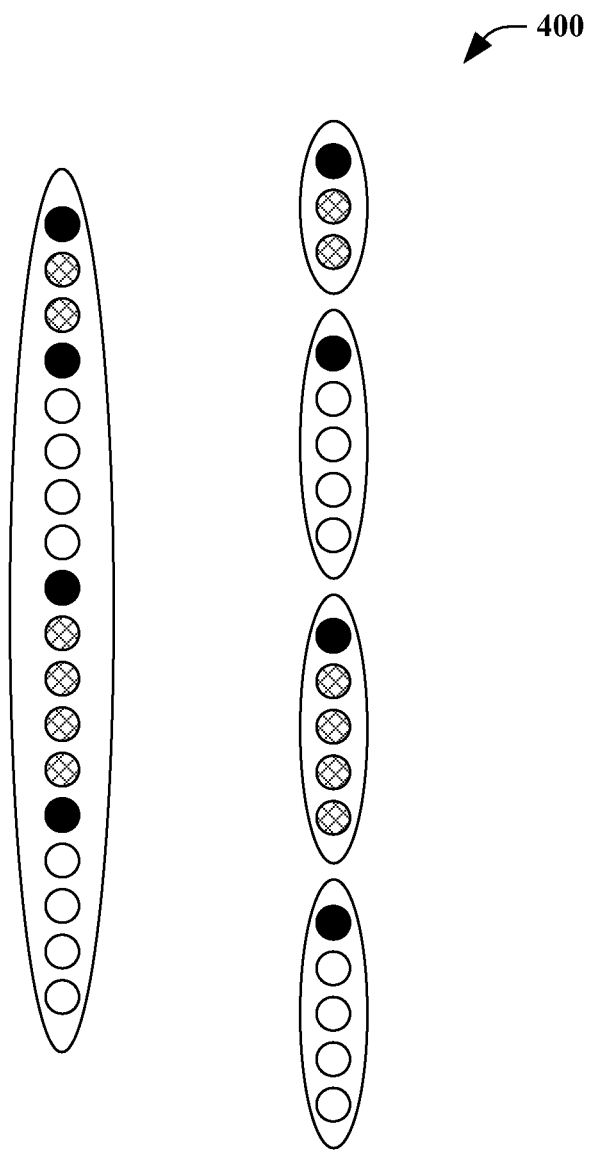
FIG. 4 is a graphical illustration of positional grouping according to a disclosed aspect.
Figure 5:
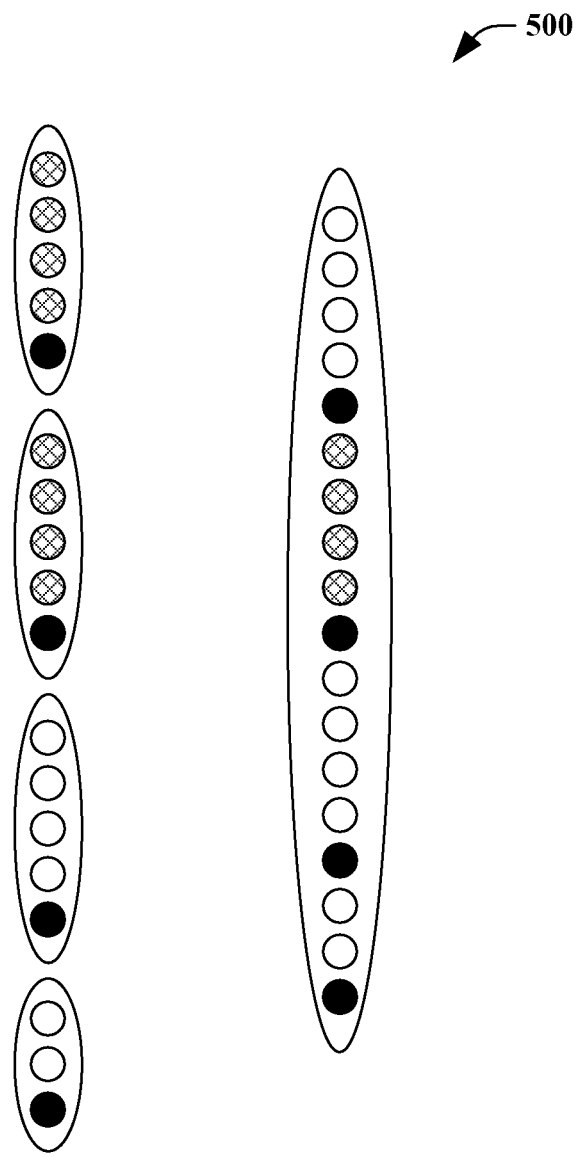
FIG. 5 is a graphical illustration of positional grouping in accordance with a disclosed aspect.
Figure 6:
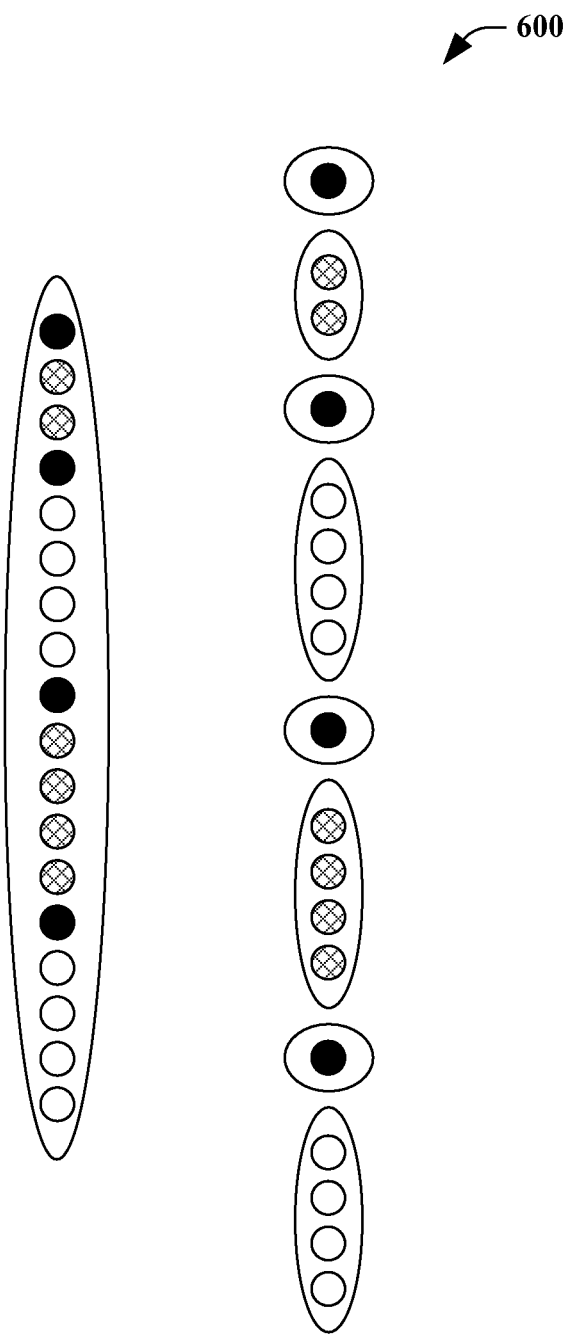
FIG. 6 is a graphical illustration of positional grouping according to an aspect of the disclosure.

FIGS. 4-6 provide graphical illustration of positional grouping in accordance with an aspect of the claimed subject matter. Positional grouping leverages order provided by a collection such as a sequence of data. The following illustration and exemplary positional operators are merely examples to facilitate clarity and understanding with respect to claimed aspects. The claims are not intended to be limited thereto or thereby.

Referring to FIG. 4, an exemplary positional grouping 400 is illustrated according to an aspect of the claimed subject matter. Here, the grouping to be performed creates groups for each sub-sequence that starts with a particular value represented by a solid black circle. Note that in this case, each result group does not have a natural key. In particular, the input sequence itself may not start with a solid circle.

Conceptually, the grouping operator associated herewith is related to a "TakeWhile" operator that copies values from the input stream into a result collection as long as a given predicate holds as follows:

```
public static IEnumerable<T> TakeWhile<T>(
    this IEnumerable<T> source,
    Func<T, bool> predicate);
```

The difference is that it is desirous to continue grouping the remainder of the input instead of skipping it after the first matching value is identified. Hence, an appropriate sequence operator named "GroupByStartingWith" can be provided with the following signature:

```
public static IEnumerable<IEnumerable<T>> GroupByStartingWith<T>(
    this IEnumerable<T> source,
    Func<T, bool> predicate);
```

Turing to FIG. 5, another positional grouping 500 is depicted graphically. A "TakeWhile" operator is related to a "SkipWhile" operator that drops elements until a condition holds:

```
public static IEnumerable<T> SkipWhile<T>(
    this IEnumerable<T> source,
    Func<T, bool> predicate);
```

Accordingly, another positional operator can correspond to one that terminates a group as soon as an element with a certain property is encountered. As illustrated, it is really the dual of the previous operator. The operator signature can be as follows:

```
public static IEnumerable<IEnumerable<T>> GroupByEndingWith<T>(
    this IEnumerable<T> source,
    Func<T, bool> predicate);
```

FIG. 6 depicts another positional grouping 600 in accordance with an aspect of the claimed subject matter. In this case, the operator creates a new group as soon as the key selector of the next value returns a new value. Accordingly, a solid circle is a group, followed by a group of crosshatched circles, then another group of one solid circle and so on. This differs from a traditional "GroupBy" operation that would collapse all groups that have the same key. This operator can be referred to as "GroupByAdjacent" and can have the following signature:

```
public static IEnumerable<IGrouping<K, E>>
    GroupByAdjacent<T, K, E>(
        this IEnumerable<T> source,
        Func<T, K> keySelector,
        Func<T, E> elementSelector);
```

Figure 7:
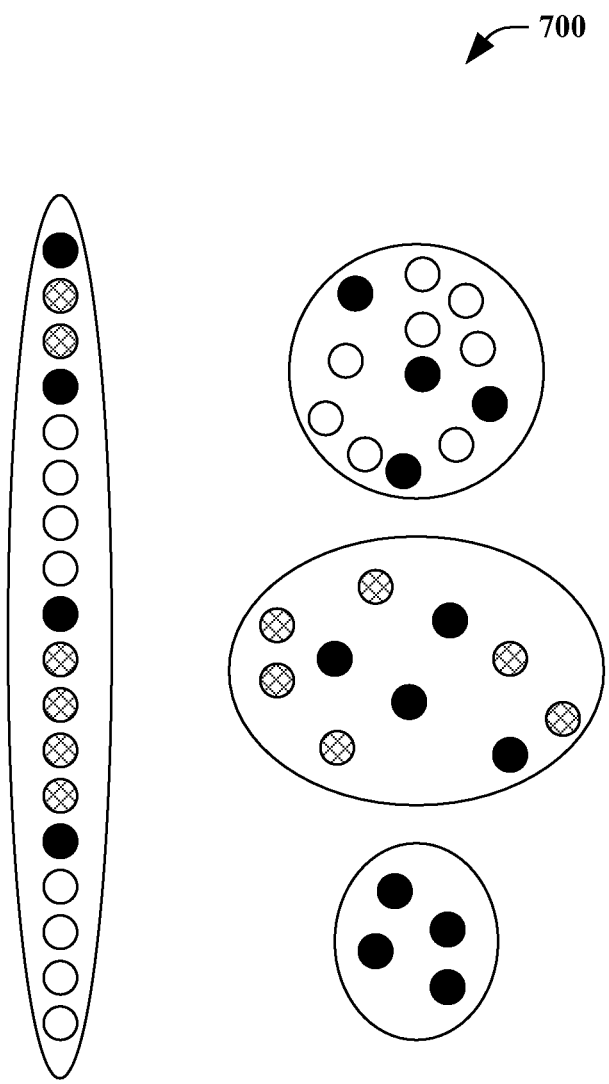
FIG. 7 is a graphical illustration of multi-member grouping in accordance with a disclosed aspect.

Referring to FIG. 7, an exemplary multi-member operator 700 is depicted graphically in accordance with an aspect of the claimed subject matter. As previously described, such an operator allows elements to be members of different groups. For example, imagine a picture has tags and it is desirous to group by tag. Now the same picture may end up in different groups (e.g., friends, vacation, family . . . ). As illustrated, the solid black, crosshatched and white circles all end up as part of their own group. Additionally, each solid black circle ends up in the crosshatched and white circle groups.

The underlying operator has the following signature where the key selector function returns a collection of possible keys. If the collection is empty, the element is filtered from the result collection. If there is at least one, then the element is placed in each group represented by the respective keys. If an element is added multiple times to the same group, duplicates are ignored. That is, the same element only appears once in each group. Alternatively, multi-set groups can be allowed as well.

```
IEnumerable<IGrouping<T, S>>
    GroupByMultiple(S, K)( IEnumerable<S> source,
        Func<S, IEnumerable<K>> keySelector )
```

Figure 8A:
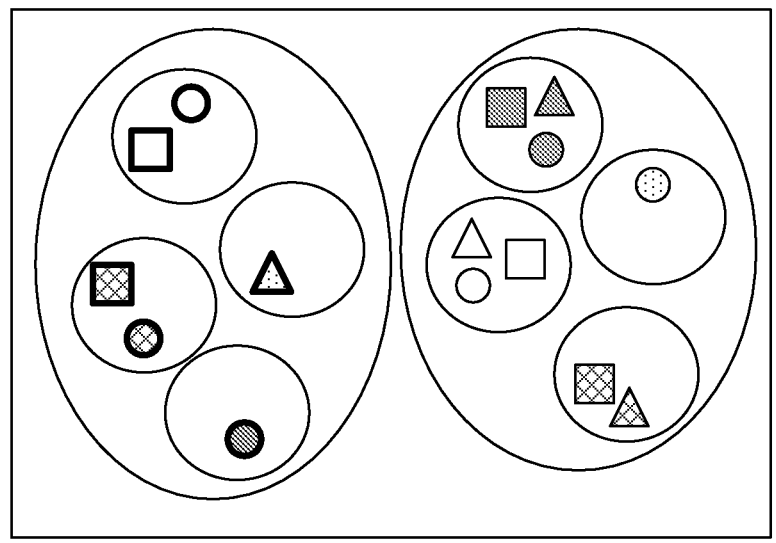
FIGS. 8a-b are graphical illustration of multi-level grouping in accordance with an aspect of the disclosure.
Figure 8B:
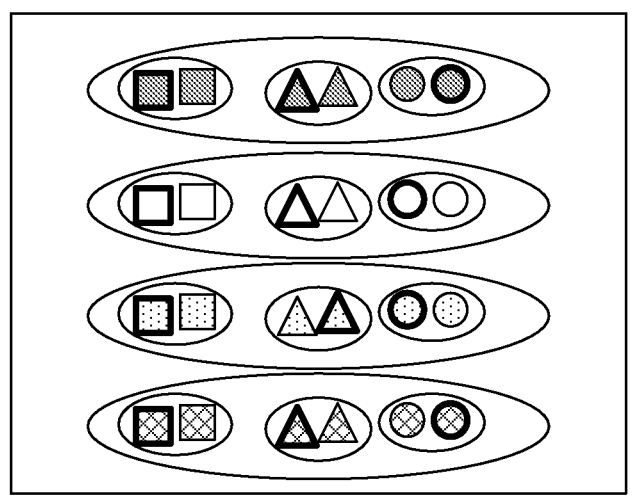

Referring to FIGS. 8*a* and 8*b*, exemplary multi-level grouping that can be performed by an operator is illustrated in accordance with an aspect of the claimed subject matter. The examples depict different ways in which grouping can be performed for simple shapes, borders and fill patterns. There are circles, squares, and triangles. Each shape has either a normal boarder or a bolded border. Further, the shape patterns are clear, solid, crosshatched, or dotted. FIG. 8*a* depicts grouping by border then fill pattern. Accordingly, the left group includes all bolded bordered shapes and the right group includes normal bordered shapes. Within each of those groups, there is another level of grouping in which those shapes are grouped by fill pattern. One might desire to know the maximum number of shapes in each sub-group. Here, that would be two for the left group and three for the right. An alternate grouping is shown in FIG. 8*b*. In this case, the shapes are grouped first by fill pattern then by shape. The result is a completely different multiple level grouping of four subgroups each including two of each shape of a particular fill pattern.

Figure 9:
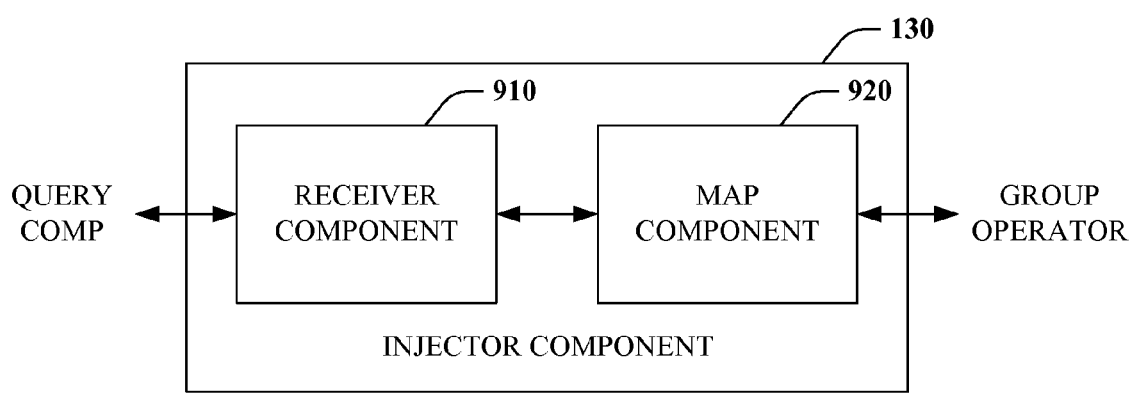
FIG. 9 is a block diagram of a representative injector component in accordance with a disclosed aspect.

Turning attention to FIG. 9, a representative injector component 130 is illustrated in accordance with an aspect of the claimed subject matter. As previously stated, the injector component 130 injects group operators and/or the functionality captured thereby into applications. In accordance with one embodiment, the group operators can form part of a language-integrated query. In such instances, query comprehension syntax can be utilized to specify queries. Query comprehension syntax is a syntactic shortcut for specifying queries in an intuitive or comprehendible manner. For example, the "Select," "From," "Where" style of SQL can be utilized in general-purpose programming languages. Further, query comprehensions can vary amongst programming languages. Query comprehension syntax can be also be utilized for various grouping operations as described herein. Consequently, the injector component 130 should be able to handle such syntax.

As illustrated, the injector component 130 includes a receiver component 910 and a map component 920. The receiver component 910 receives, retrieves or otherwise obtains or acquires a query comprehension or more particularly a group query comprehension and makes it available to the map component 920. The map component 920 maps or transforms group query comprehension syntax to specific standard group operators. As a result, developers can specify queries and group functionality in an intuitive syntax, which can then be transformed to the appropriate operator calls and/or implementation.

Figure 10:
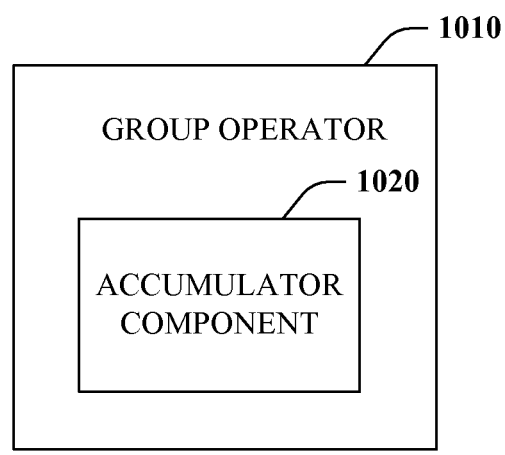
FIG. 10 is a block diagram of a representative group operator component according to an aspect of the disclosure.

FIG. 10 depicts a representative group operator component 1010 in accordance with an aspect of the claimed subject matter. Among other things, the representative group operator component 1010 includes an accumulator component 1020. This component 1020 can accumulate intermediate results to optimize execution. By way of example, suppose that a collection produces four groups in accordance with a grouping operation. Further, suppose that immediately following that an operation is going to be performed on each group such as counting how many elements are in each group. There is no reason to create these groups. Results can simply be calculated and passed around until a final result needs to be produced. In this manner, construction of complicated group result structures can be avoided. The accumulation component 1020 provides the ability to accumulate these intermediate results.

In accordance with one embodiment, the accumulation component 1020 can be a function that is passed to a group operator. Consider the "GroupByStartingFrom" and "GroupByEndingWith" operators with respective signatures:

```
public static IEnumerable<IEnumerable<T>> GroupByStartingWith<T>(
    this IEnumerable<T> source,
    Func<T, bool> predicate);
public static IEnumerable<IEnumerable<T>> GroupByEndingWith<T>(
    this IEnumerable<T> source,
    Func<T, bool> predicate);
```

Alternate operators can be provided that utilize an accumulating function, as follows:

```
public static IEnumerable<IEnumerable<S>> GroupByStartingWith<S,T>(
    this IEnumerable<T> source,
    Func<T, bool> predicate,
    Func<T,S> selector);
public static IEnumerable<IEnumerable<S>> GroupByEndingWith<S,T>(
    this IEnumerable<T> source,
    Func<T, bool> predicate,
    Func<T,S> selector);
```

Here, the second overload takes a selector function that is applied to elements in the input sequence before adding the value into the output sequence. Like normal group operators, overloads also are supported where a predicate (and a selector) takes an integer argument that identifies the position in the original input sequence.

Stated differently, group operators can take a continuation function that returns results instead of returning one or more groups. Consider a simple "GroupBy" operator with the following signature:

```
static IEnumerable<IGrouping<K, T>> GroupBy<T, K>
    (this IEnumerable<T> source
    , Func<T, K> keySelector
    );
```

This now becomes:

```
static IEnumerable<R> GroupBy<T, K,R>
    (this IEnumerable<T> source
    , Func<T, K> keySelector
    , Func< IGrouping<K, T>, IEnumerable<R>> selector
    );
```

The semantics are the same as running the original overload followed by a "SelectMany" using the continuation. However, this overload is more efficient since it does not require intermediate structures to be built.

The aforementioned systems, architectures, and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 11-16. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 11:
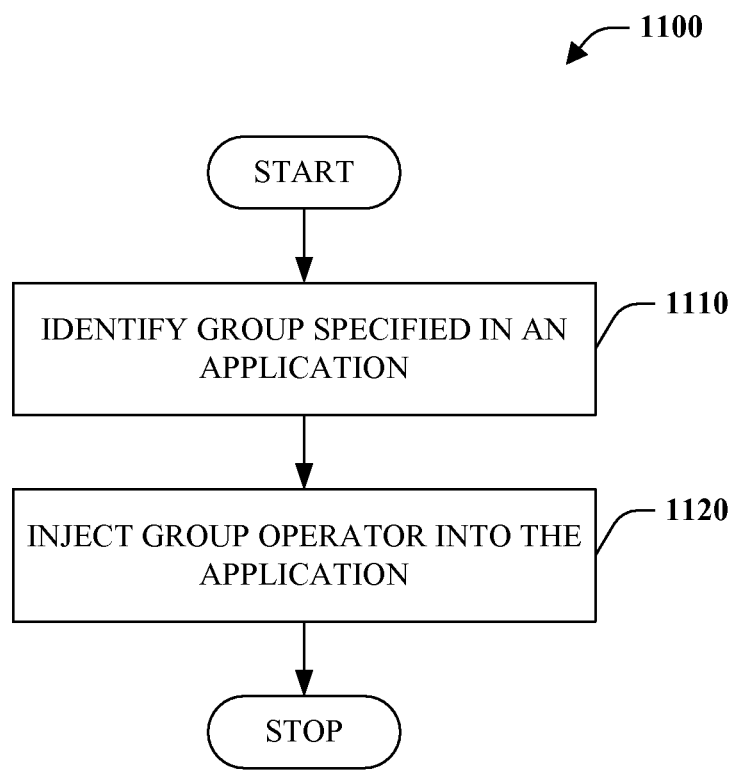
FIG. 11 is a flow chart diagram of a method of application processing to introduce expressive group operators in accordance with an aspect of the disclosure.

Referring to FIG. 11, a method of application processing 1100 is illustrated in accordance with an aspect of the claimed subject matter. At reference numeral 1110, a group is identified in an application. The group can form part of a language-integrated query. In one instance, a call to a group operator can be identified. Alternatively, alternate query comprehension syntax referencing a group can be identified, among other things. At numeral 1120, a group operator or functionality associated with a group operator is injected within the application statically at compile time or dynamically at run time. According to an aspect of the claims, the group operator can be a positional, multi-member, and/or multi-level operator.

Figure 12:
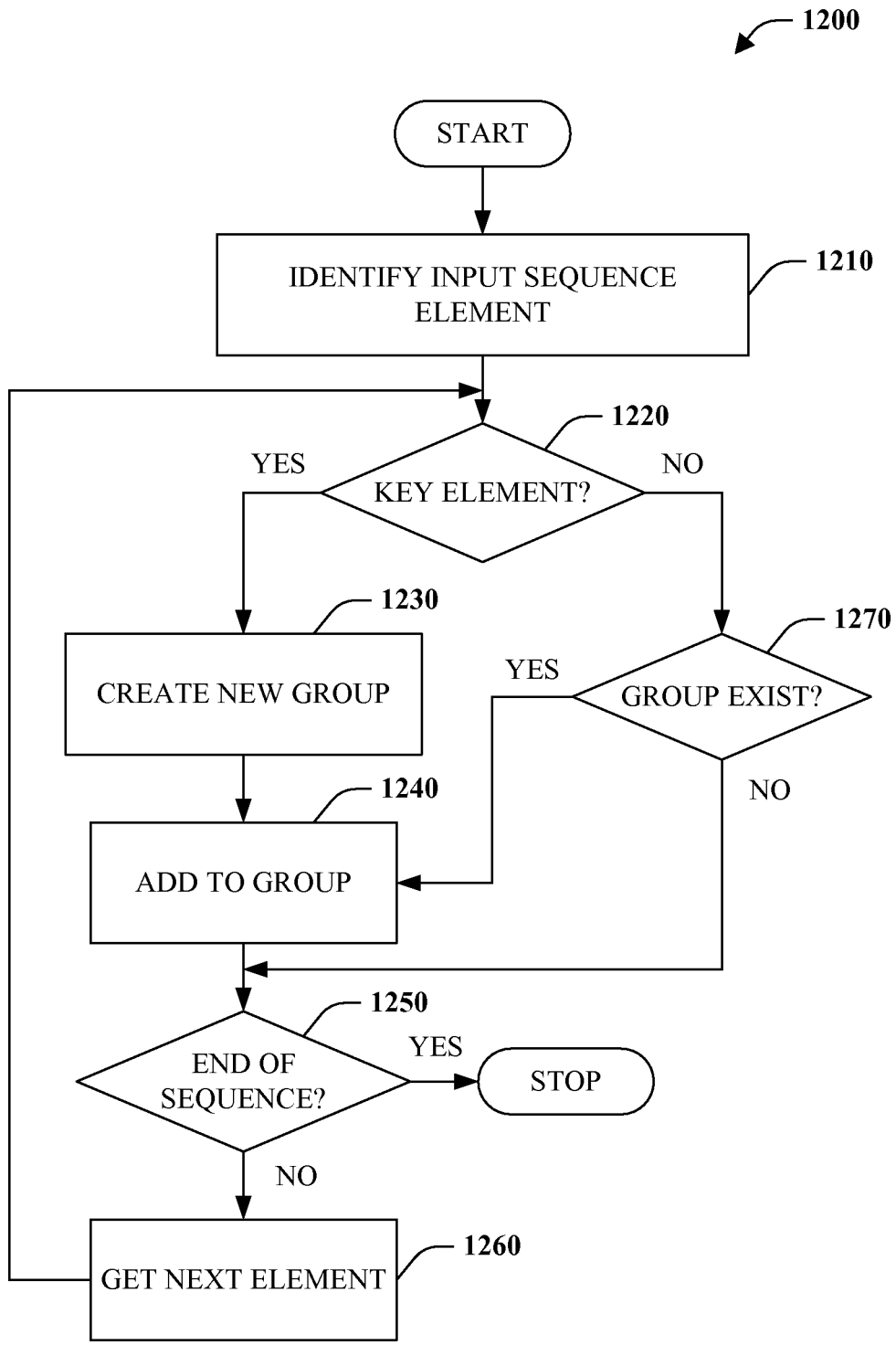
FIG. 12 is a flow chart diagram of a positional grouping method "GroupByStartingWith" according to a disclosed aspect.

FIG. 12 is a method of positional grouping "GroupByStartingWith" 1200 according to an aspect of the claimed subject matter. At reference numeral 1210, an input sequence element is identified. A check is made at numeral 1220 as to whether the element is a key element. If yes, the method continues at reference 1230 where a new group is created. The element can then be added to the newly created group at numeral 1240. A determination as to whether theft end of the sequence has been reached is made at numeral 1250. If the end has been reached ("YES"), the method simply terminates. Alternatively, if there are more elements to examine ("NO"), the next element is fetched from the sequence at numeral 1260 and the method proceeds back to numeral 1220. At reference 1220, if the element is not the key element, the method continues at reference numeral 1270 where a check is made pertaining to whether a group already exists. If a group already exists ("YES"), the method proceeds to reference 1240 where the element is added to the current group. If a group does not exist ("NO"), the method continues at 1250. If effect, if a group has not yet been created due to identification of a key element, those values will be disregarded.

Figure 13:
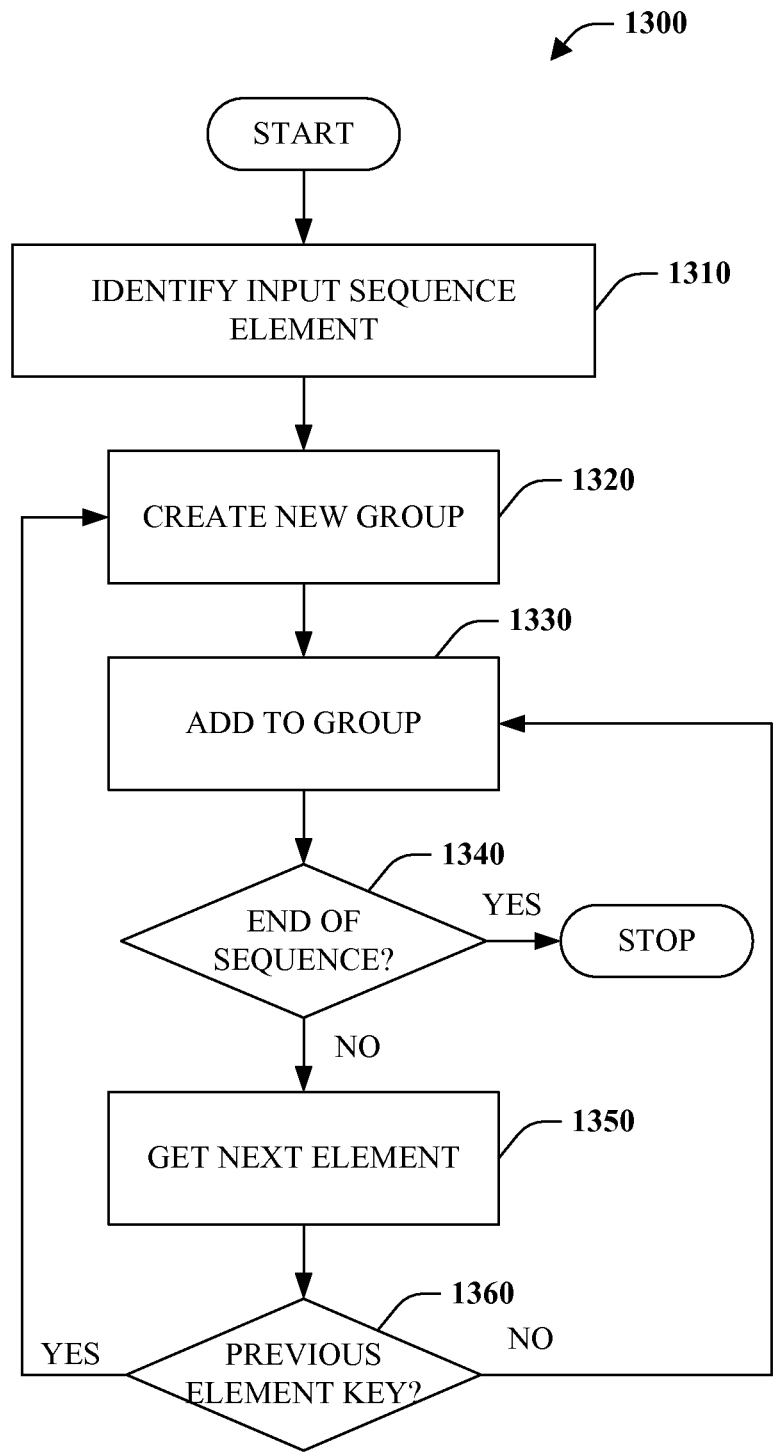
FIG. 13 is a flow chart diagram of a positional grouping method "GroupByEndingWith" in accordance with an aspect of the disclosure.

FIG. 13 is a method of positional grouping "GroupByEndingWith" in accordance with an aspect of the claimed subject matter. At reference numeral 1310, an element from a data input sequence is identified such as the first element of the sequence. At numeral 1320 and 1330, a new group is created and the identified element is added to the group, respectively. A check is made at 1340 as to whether the end of the sequence has been reached. If yes, the method terminates. If no, the method continues at numeral 1350 where the next element is retrieved. At reference numeral 1360, a determination is made as to whether the last element was a key element. If yes, the method proceeds to 1320 where a new group is created prior to adding the newly retrieved element thereto. If no, the method continues at 1330 where the new element is added to a prior group.

Figure 14:
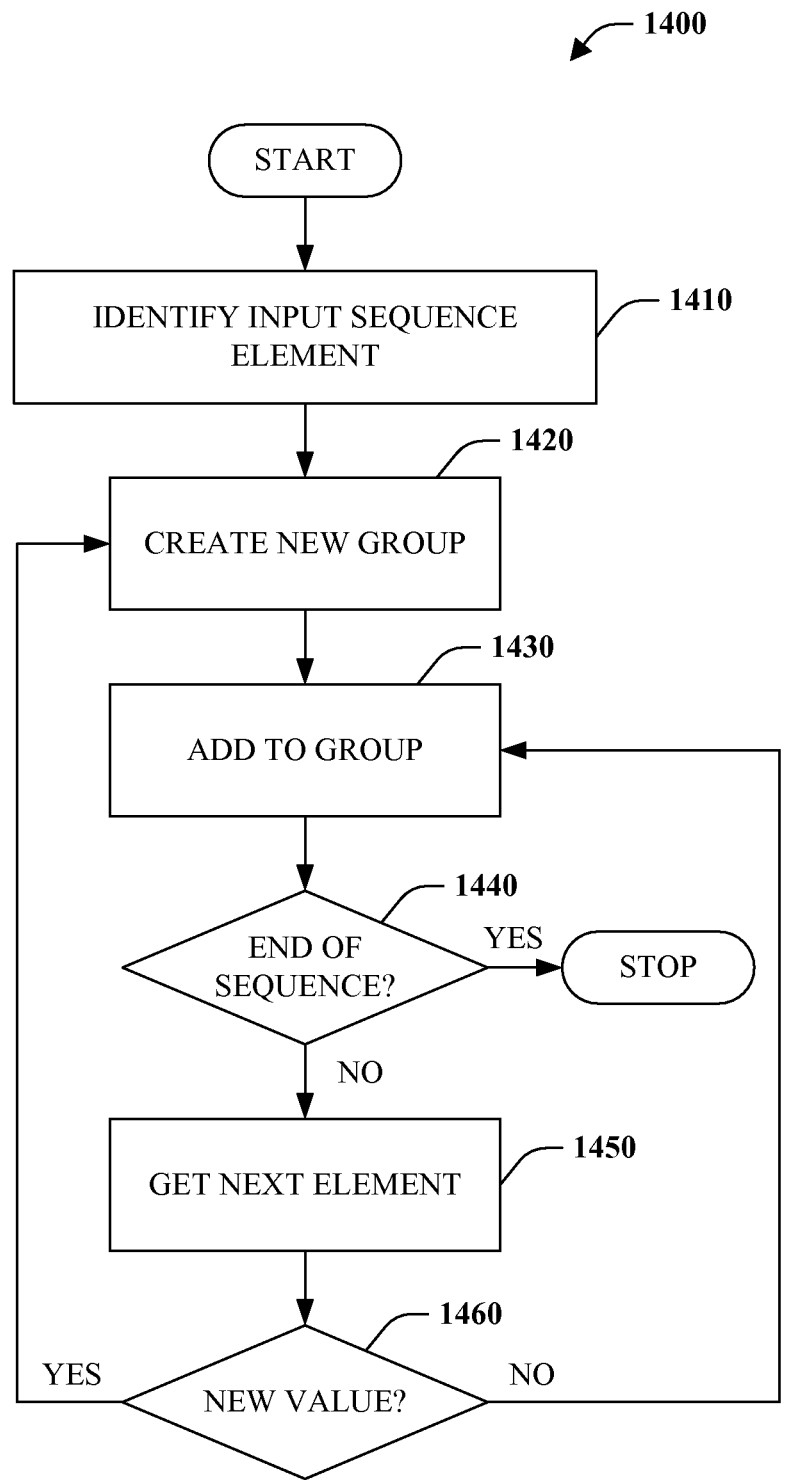
FIG. 14 a flow chart diagram of a positional grouping method "GroupByAdjacent" according to a disclosed aspect.

FIG. 14 is a method of positional grouping "GroupByAdjacent" 1400 according to an aspect of the claimed subject matter. Similar to previous methods, at reference numeral 1410 an input sequence element is identified. At new group is created at numeral 1420 and the identified element added thereto at 1430. If it is determined that the end of the sequence has been reach at numeral 1440 then the method terminates. Alternatively, the method proceeds to reference 1450 where the next element is retrieved or otherwise acquired. A determination is made at 1460 as to whether the newly retrieved element is of a different value than the previous element. If yes, a new group is created for the element at 1420. If no, the element is added to a current group at 1430.

Figure 15:
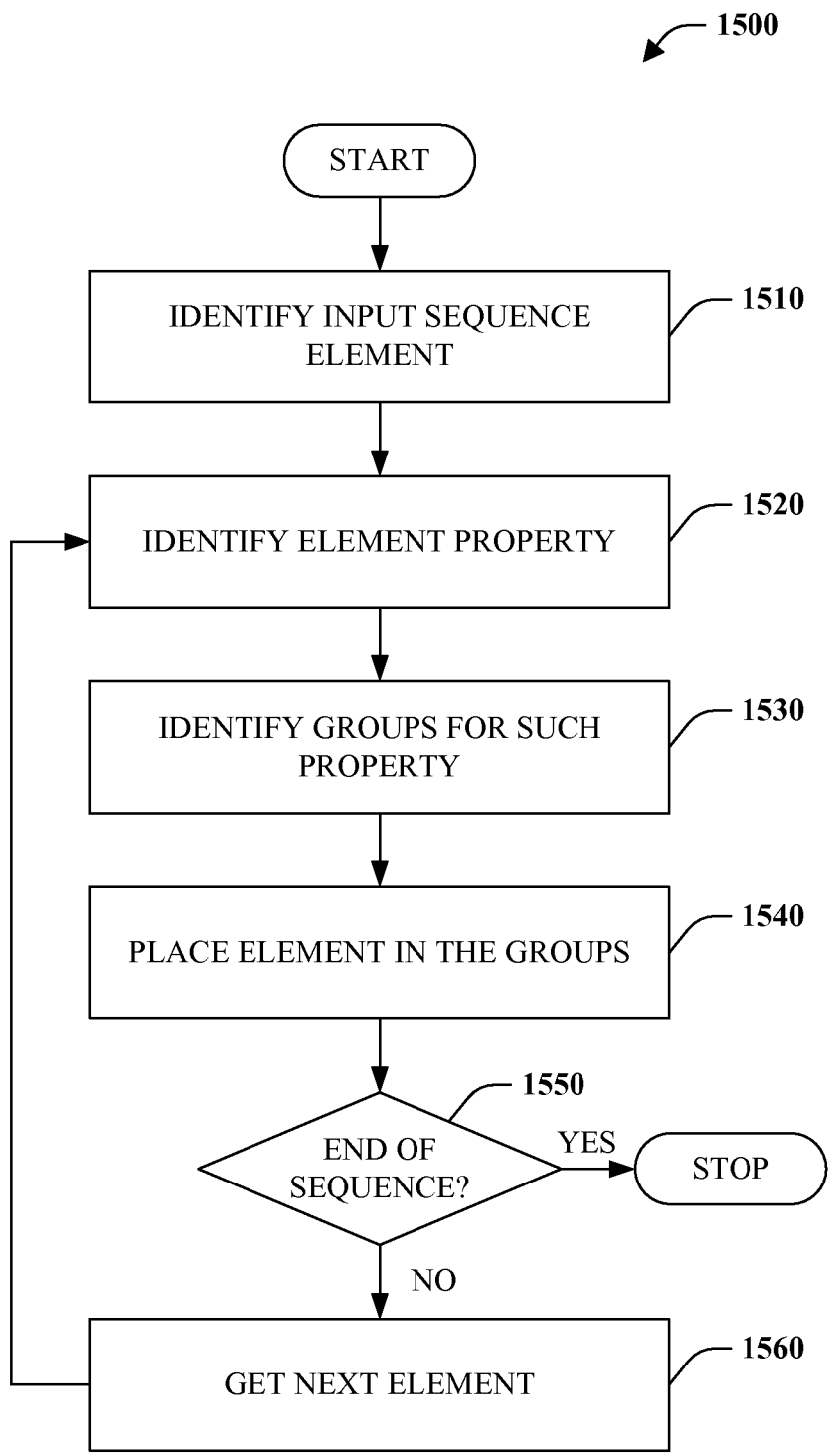
FIG. 15 is a flow chart diagram of a multi-member grouping method in accordance with an aspect of the disclosure.

Turning attention to FIG. 15, a multi-member grouping method 1500 shown in accordance with an aspect of the claimed subject matter. An input element from a sequence is first identified or retrieved at reference numeral 1510. At numeral 1520, a property associated with the element is identified. Groups are identified, at reference 1530, for the property, and the element is placed in one or more groups at numeral 1540. At reference numeral 1550, a determination is made concerning whether the end of the sequence has been reached. If yes, the method terminates. If no, the method continues at 1560 where the next element is acquired and proceeds back to 1520. This method assumes that groups are already created, however groups can be created as an input sequence is iterated.

Figure 16:
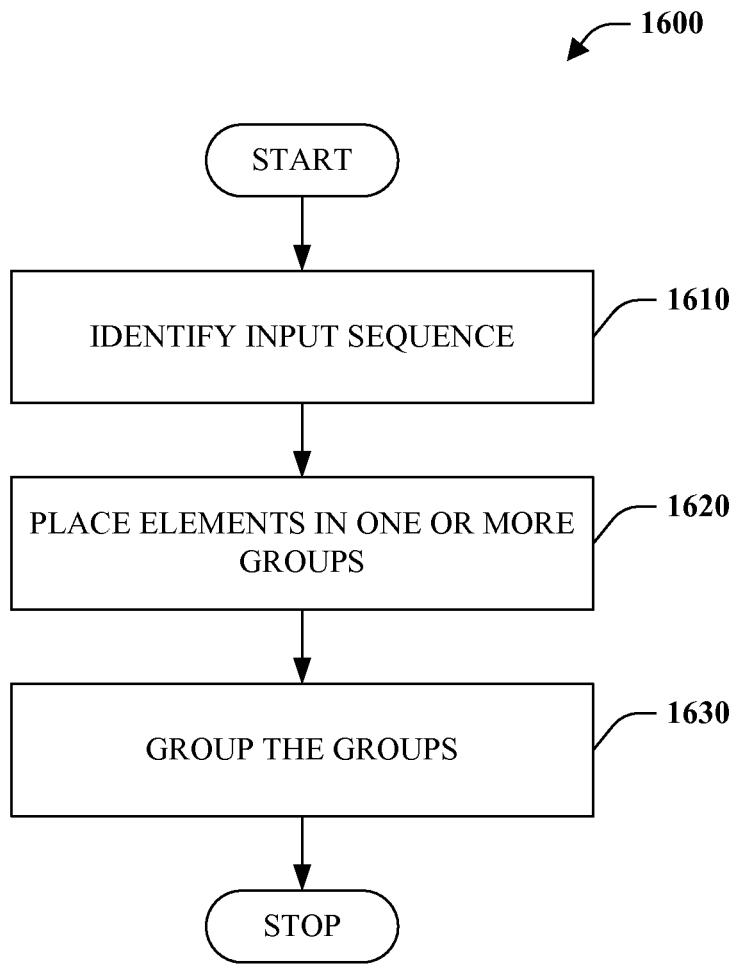
FIG. 16 is a flow chart diagram of a multi-level grouping method according to a disclosed aspect.

FIG. 16 is a flow chart diagram of a multi-level grouping method 1600 in accordance with an aspect of the disclosed subject matter. An input sequence or other collection of data is identified at reference numeral 1610. At numeral 1620, elements of the collection are placed in groups. For example, groups can be formed based on positional grouping and more than one element can be present in a group. At reference numeral 1630, the grouping is applied to the generated groups. Again, various grouping operations can be performed to produce these groups of groups. Method 1600 thus provides nesting or hierarchical grouping.

Figure 17:
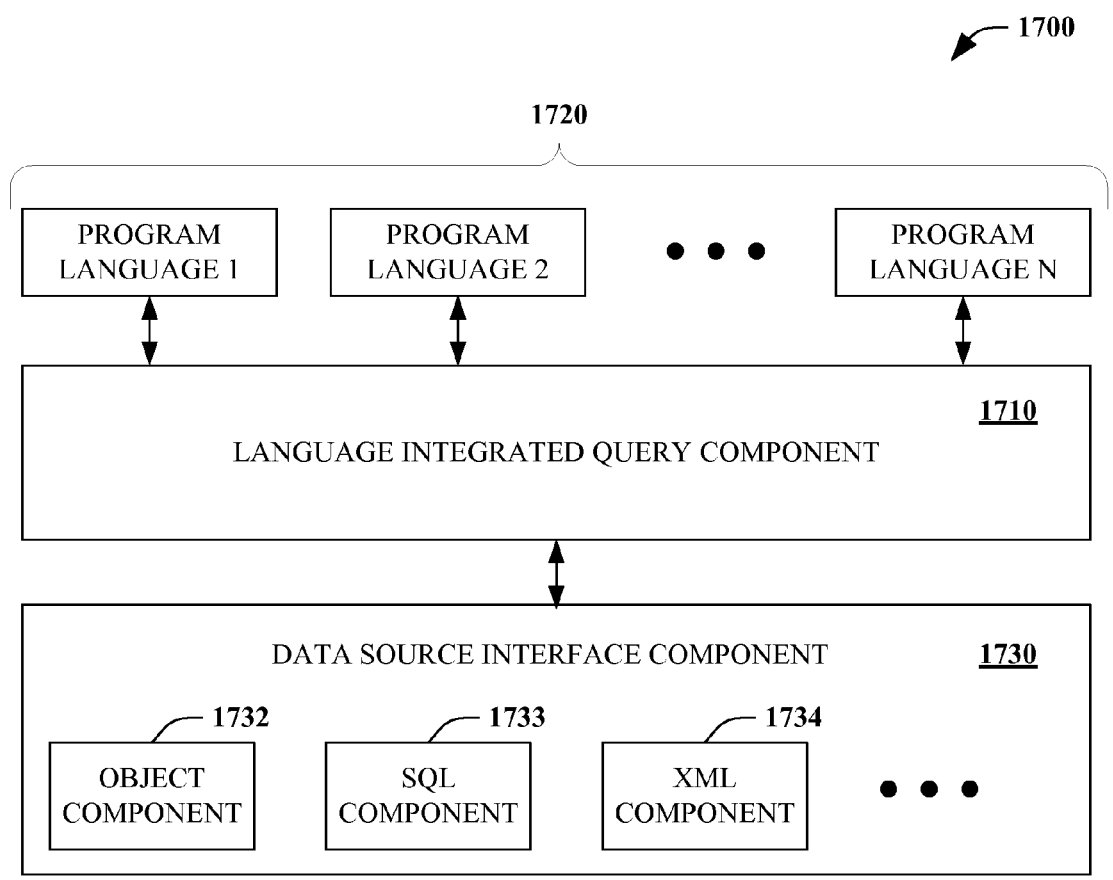
FIG. 17 is a schematic block diagram of an exemplary language integrated query architecture in which aspects of the disclosure can be employed.

Turning attention to FIG. 17, an exemplary architecture 1700 is depicted in which aspects of the claimed subject matter can be practiced. As shown, the architecture 1700 includes a language integrated query component 1710. This component 1710 provides standardized query operators and processing mechanisms, among other things. The language integrated query component 1710 can afford such functionality to a number of programming languages 1720. In other words, many general-purpose programming languages (e.g., C#, Visual Basic, Java . . . ) can leverage component 1710 to include data query functionality within the language. The language integrated query component 1710 can also interact with data source interface component 1730 to enable data from multiple sources to be queried or otherwise manipulated. As shown, the data source interface component 1730 includes a number of sub-components 1732, 1733, and 1734 to facilitate interaction with at least objects, relational data, and XML (eXtensible Markup Language). In accordance with one embodiment, the aforementioned expressive grouping functionality can be applied to such language-integrated queries to extend functionality provided thereby.

The word "exemplary" or various forms thereof are used herein to mean serving as an example, instance, or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 18:
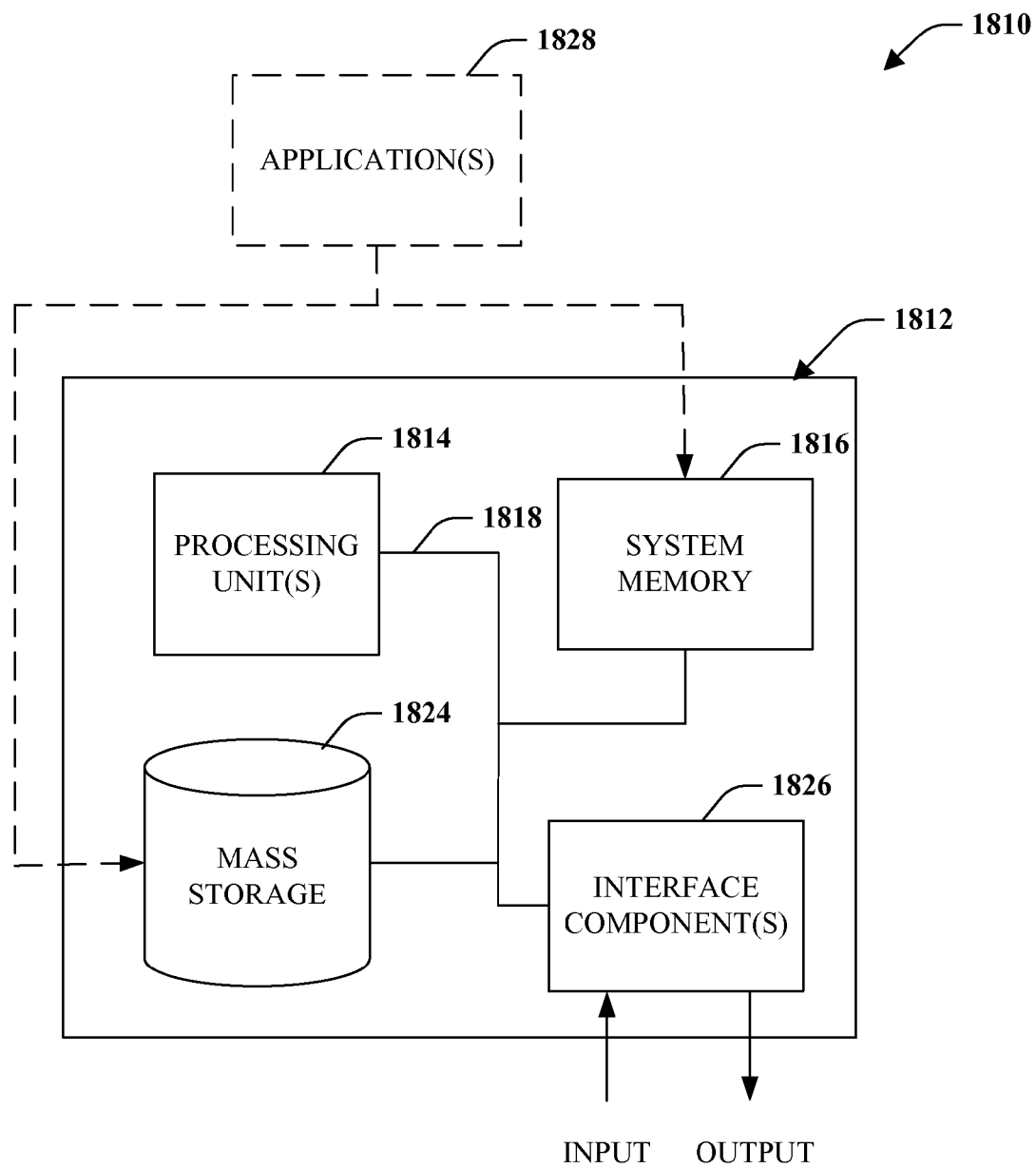
FIG. 18 is a schematic block diagram illustrating a suitable operating environment for aspects of the subject disclosure.
Figure 19:
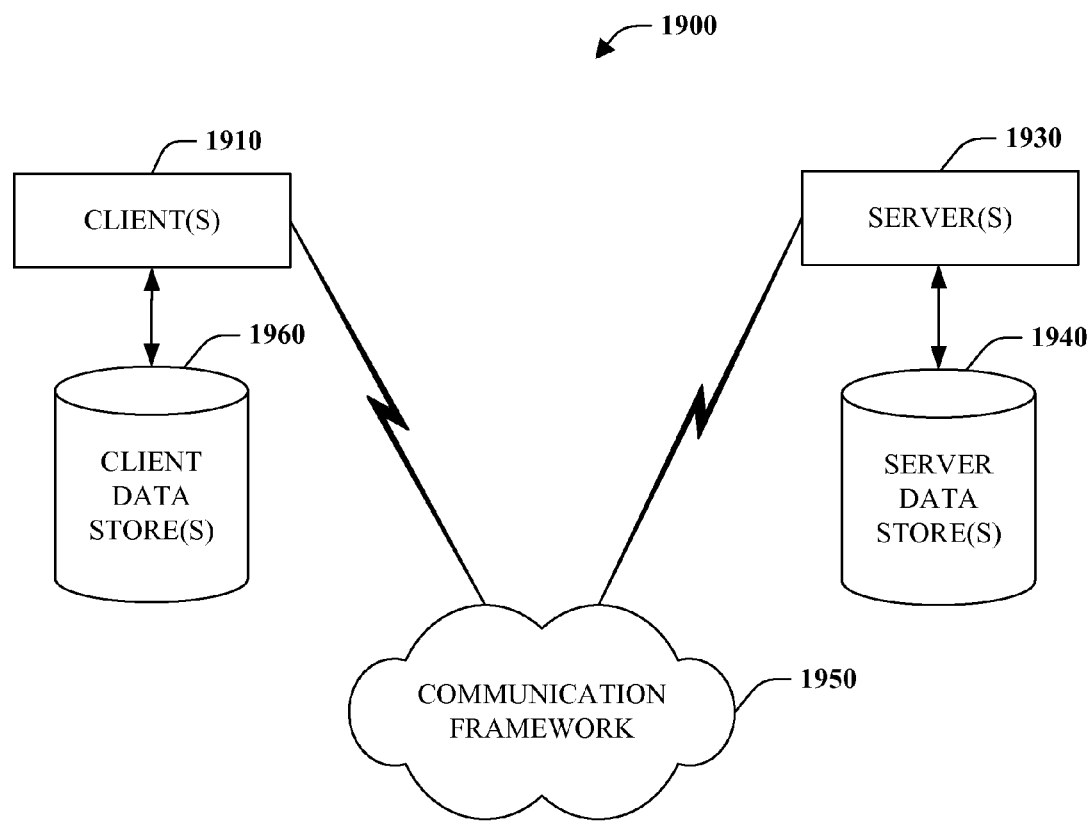
FIG. 19 is a schematic block diagram of a sample-computing environment.

In order to provide a context for the various aspects of the disclosed subject matter, FIGS. 18 and 19 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 18, an exemplary environment 1810 for implementing various aspects disclosed herein includes a computer 1812 (e.g., desktop, laptop, server, hand held, programmable consumer or industrial electronics . . . ). The computer 1812 includes a processing unit 1814, a system memory 1816, and a system bus 1818. The system bus 1818 couples system components including, but not limited to, the system memory 1816 to the processing unit 1814. The processing unit 1814 can be any of various available microprocessors. It is to be appreciated that dual microprocessors, multi-core and other multiprocessor architectures can be employed as the processing unit 1814.

The system memory 1816 includes volatile and nonvolatile memory. The basic input/output system (BIOS), containing the basic routines to transfer information between elements within the computer 1812, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1812 also includes removable/non-removable, volatile/nonvolatile computer storage media. FIG. 18 illustrates, for example, mass storage 1824. Mass storage 1824 includes, but is not limited to, devices like a magnetic or optical disk drive, floppy disk drive, flash memory, or memory stick. In addition, mass storage 1824 can include storage media separately or in combination with other storage media.

FIG. 18 provides software application(s) 1828 that act as an intermediary between users and/or other computers and the basic computer resources described in suitable operating environment 1810. Such software application(s) 1828 include one or both of system and application software. System software can include an operating system, which can be stored on mass storage 1824, that acts to control and allocate resources of the computer system 1812. Application software takes advantage of the management of resources by system software through program modules and data stored on either or both of system memory 1816 and mass storage 1824.

The computer 1812 also includes one or more interface components 1826 that are communicatively coupled to the bus 1818 and facilitate interaction with the computer 1812. By way of example, the interface component 1826 can be a port (e.g., serial, parallel, PCMCIA, USB, FireWire . . . ) or an interface card (e.g., sound, video, network . . . ) or the like. The interface component 1826 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1812 to output device(s) via interface component 1826. Output devices can include displays (e.g., CRT, LCD, plasma . . . ), speakers, printers and other computers, among other things.

FIG. 19 is a schematic block diagram of a sample-computing environment 1900 with which the subject innovation can interact. The system 1900 includes one or more client(s) 1910. The client(s) 1910 can be hardware and/or software (e.g., threads, processes, computing devices). The system 1900 also includes one or more server(s) 1930. Thus, system 1900 can correspond to a two-tier client server model or a multi-tier model (e.g., client, middle tier server, data server), amongst other models. The server(s) 1930 can also be hardware and/or software (e.g., threads, processes, computing devices). The servers 1930 can house threads to perform transformations by employing the aspects of the subject innovation, for example. One possible communication between a client 1910 and a server 1930 may be in the form of a data packet transmitted between two or more computer processes.

The system 1900 includes a communication framework 1950 that can be employed to facilitate communications between the client(s) 1910 and the server(s) 1930. The client(s) 1910 are operatively connected to one or more client data store(s) 1960 that can be employed to store information local to the client(s) 1910. Similarly, the server(s) 1930 are operatively connected to one or more server data store(s) 1940 that can be employed to store information local to the servers 1930.

Client/server interactions can be utilized with respect with respect to various aspects of the claimed subject matter. By way of example and not limitation, expressive grouping can be applied with respect to remote data sources. In one instance, an application including a language-integrated query that employs such grouping functionality can be executed on a client 1910 that communicates over communication framework 1950 to a server 1930 to acquire data housed on one or more server data stores 1940.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. A computer system, comprising at least one processor coupled to at least one computer-readable storage medium storing instructions executable by the at least one processor to implement:
   an application component including computer executable functionality;
   a group component configured to facilitate execution of each of a positional, multi-member, and multi-level group operator specified by the application component, positional group operators being operators for which position within an ordering of one or more elements affects results of the operators, multi-member operators being operators that can cause a specific element to concurrently occupy a plurality of groups, multi-level group operators being operators that can cause a first group to be nested within a second group; and
   an injector component configured to identify a reference to a group operator in the group component, fetch functionality corresponding to the identified group operator from the group component and inject the functionality into the application component to produce new executable grouping functionality, the injector component being configured to identify, fetch, and inject when the application component is encoded in any of a plurality of program languages.

2. The system of claim 1, wherein
   the group operator comprises an accumulator component configured to accumulate an intermediate result of a grouping operation and, based on the intermediate result, facilitate the avoidance of a further, redundant grouping operation, and
   the accumulator component is configured to be passed as a function to the group operator.

3. The system of claim 2, wherein the function includes a continuation function to cause the group operator to return the intermediate result instead of returning one or more groups.

4. The system of claim 1, wherein the group operator is executable across different data sources.

5. The system of claim 1, wherein the group operator is executable across an ordered set of data.

6. The system of claim 1, wherein the group operator is configured to divide elements into groups upon identification of an element that satisfies a predicate.

7. The system of claim 1, wherein the group operator is configured to, when at least one element not satisfying a predicate appears prior in the ordering to at least one element satisfying the predicate, divide elements into groups based upon the ordering, beginning each group with an initial element in the ordering or an element that is immediately subsequent to any element that satisfies a predicate, and terminating each group with a next element in the ordering that satisfies the predicate.

8. The system of claim 1, wherein the group operator is configured to create a new group upon determination that a next element is of a different value than a previous element.

9. The system of claim 1, wherein the group component is configured to facilitate execution of the positional, multi-member, and multi-level group operators.

10. The system of claim 1, the group operator comprising an accumulator component configured to accumulate intermediate results and output a final result to avoid generation of groups from in-memory representations thereof.

11. A data interaction method, comprising:
    obtaining at least a portion of a computer program expressed in a query comprehension syntax;
    identifying a plurality of references to a plurality of query group operators in the portion of the computer program, the plurality of query group operators including a positional group operator, a multi-member group operator, and a multi-level group operator, positional group operators being operators for which position within an ordering of one or more elements affects results of the operators, multi-member operators being operators that can cause a specific element to be concurrently included in a plurality of groups, multi-level group operators being operators that can cause a first group to be nested within a second group;
    mapping the identified plurality of query group operators to one or more standard group operators; and
    inserting the one or more standard group operators into the referencing computer program to enable grouping of ordered data as part of a data query operation,
    wherein the computer program is encoded in any of a plurality of program languages.

12. The method of claim 11, further comprising:
    performing positional grouping using a plurality of inserted standard group operators, including, for an input sequence;
    creating groups for each sub-sequence that starts with a particular value;
    terminating a group when an element with a predetermined property is encountered;
    creating a new group when a key selector of a next value returns a new value; and
    allowing elements to concurrently be members of different groups.

13. The method of claim 11, further comprising inserting the one or more standard group operators into the referencing computer program at one of a compile time or a run time.

14. The method of claim 13, further comprising grouping input data as a function of position of the input data in the ordering.

15. The method of claim 13, further comprising injecting input elements into more than one group concurrently.

16. The method of claim 13, further comprising: constructing nested groupings.

17. The method of claim 13, further comprising: passing intermediate results to an accumulation function in memory to provide a desired result and avoid group construction.

18. A computer-readable storage medium storing instructions that, if executed by a computing device, cause the computing device to perform operations comprising:
    scanning a computer program coded in any one of a plurality of programming languages;

based on the scanning, identifying grouping functionality for grouping sequences of data independent of the programming language; and injecting the grouping functionality into the computer program to facilitate sequence-based grouping in conjunction with a language-integrated query, the grouping functionality including a positional group operator, a multi-member group operator, and a multi-level group operator, positional group operators being operators for which position within an ordering of one or more elements affects results of the operators, multi-member operators being operators that can cause a specific element to be concurrently included in a plurality of groups, multi-level group operators being operators that can cause a first group and a second group to be grouped within a third group while preserving the separateness of the first group and the second group.

19. The computer-readable storage medium of claim 18, the grouping functionality including adding sequence elements to more than one group.

20. The computer-readable storage medium of claim 18, the grouping functionality including performing hierarchical grouping.

* * * * *